US010760657B2

(12) United States Patent
Heiraas et al.

(10) Patent No.: US 10,760,657 B2
(45) Date of Patent: Sep. 1, 2020

(54) APPARATUS UTILIZING PLANETARY GEARSET COUPLED TO A CONSTANT TORSION SPRING

(71) Applicant: Riekor Corporation, Eden Prairie, MN (US)

(72) Inventors: Ryan Heiraas, Savage, MN (US); Timothy A. Erhart, Chanhassen, MN (US); John Russell Kingery, Eden Prairie, MN (US)

(73) Assignee: Riekor Corporation, Eden Prairie, MN (US)

( * ) Notice: Subject to any disclaimer, the term of this patent is extended or adjusted under 35 U.S.C. 154(b) by 86 days.

(21) Appl. No.: 15/723,836

(22) Filed: Oct. 3, 2017

(65) Prior Publication Data
US 2018/0023675 A1    Jan. 25, 2018

Related U.S. Application Data

(63) Continuation of application No. 14/847,317, filed on Sep. 8, 2015, now Pat. No. 9,791,027.

(51) Int. Cl.
| *F16H 33/06* | (2006.01) |
| *F16H 1/28* | (2006.01) |
| *F16H 35/10* | (2006.01) |
| *F16H 33/02* | (2006.01) |
| *F16H 37/08* | (2006.01) |

(52) U.S. Cl.
CPC ............... *F16H 33/06* (2013.01); *F16H 1/28* (2013.01); *F16H 33/02* (2013.01); *F16H 35/10* (2013.01); *F16H 37/0826* (2013.01)

(58) Field of Classification Search
CPC ............. F16H 1/28; F16H 33/06; F16H 35/10
See application file for complete search history.

(56) References Cited

U.S. PATENT DOCUMENTS

| 2,459,972 | A | 1/1949 | Starkey |
| 2,833,534 | A | 5/1958 | Foster |
| 4,669,578 | A | 6/1987 | Fukamachi |
| 4,791,833 | A | 12/1988 | Sakai et al. |
| 4,921,208 | A | 5/1990 | LaMarca |
| 5,029,682 | A | 7/1991 | Maurer et al. |
| 5,988,319 | A | 11/1999 | Hudson et al. |

(Continued)

FOREIGN PATENT DOCUMENTS

| DE | 2313698 | 10/1974 |
| DE | 3525208 | 1/1986 |

(Continued)

OTHER PUBLICATIONS

International Search Report and Written Opinion from PCT Application No. PCT/US2016/049389 dated Feb. 1, 2017, 15 pages.

*Primary Examiner* — Huan Le
(74) *Attorney, Agent, or Firm* — Merchant & Gould P.C.

(57) ABSTRACT

A gearbox includes a planetary gearset, an input shaft coupled to a sun gear of the planetary gearset, and an output shaft coupled to planet gears of the planetary gearset via a carrier. A constant torsion spring is coupled to a ring gear of the planetary gearset. The constant torsion spring is capable of preventing the ring gear from moving when a torque at the output shaft is below a threshold. The ring gear winds the constant torsion spring in response to the torque exceeding the threshold.

8 Claims, 7 Drawing Sheets

(56) References Cited

U.S. PATENT DOCUMENTS

| | | |
|---|---|---|
| 6,173,939 B1 | 1/2001 | Dottavio |
| 6,544,139 B1 | 4/2003 | Gierer et al. |
| 8,277,349 B2 | 10/2012 | Erhart et al. |
| 8,360,393 B2 | 1/2013 | Park |
| 8,708,852 B2 | 4/2014 | Park |
| 9,791,027 B2 * | 10/2017 | Heiraas .................. F16H 33/06 |
| 2014/0027965 A1 | 1/2014 | Holloway et al. |
| 2015/0051039 A1 | 2/2015 | Keeney et al. |
| 2016/0017974 A1 | 1/2016 | Hofmann et al. |

FOREIGN PATENT DOCUMENTS

| | | |
|---|---|---|
| DE | 19519638 | 12/1996 |
| FR | 2669983 | 6/1992 |
| GB | 2388177 | 11/2003 |
| RU | 2252445 C2 | 5/2005 |
| RU | 2350813 C1 | 3/2009 |
| WO | 2014000558 | 3/2014 |
| WO | 2014135274 | 9/2014 |

\* cited by examiner

APPARATUS UTILIZING PLANETARY GEARSET COUPLED TO A CONSTANT TORSION SPRING

This application is a Continuation of pending U.S. application Ser. No. 14/847,317, filed Sep. 8, 2015, now U.S. Pat. No. 9,791,027, entitled APPARATUS UTILIZING PLANETARY GEARSET COUPLED TO A CONSTANT TORSION SPRING, which is incorporated herein by reference.

SUMMARY

The present disclosure is directed to an apparatus utilizing a planetary gearset coupled to a constant torsion spring. In one embodiment, a gearbox includes a planetary gearset, an input shaft coupled to a sun gear of the planetary gearset, and an output shaft coupled to planet gears of the planetary gearset via a carrier. A constant torsion spring is coupled to a ring gear of the planetary gearset. The constant torsion spring is capable of preventing the ring gear from moving when a torque at the output shaft is below a threshold. The ring gear winds the constant torsion spring in response to the torque exceeding the threshold.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to apparatuses utilizing planetary gearsets and constant torsion springs. A planetary gearset includes a sun gear located centrally within a ring gear. A set of planet gears couples the ring gear to the sun gear, and a carrier fixes the planet gears with respect to one another. By fixing any one of the carrier, the sun gear, and the ring gear, a gear ratio is set for the other two, and this gear ratio is different depending on which is fixed. In other configurations, all three of the carrier, the sun gear, and the ring gear can rotate at the same time.

In embodiments described herein, an apparatus (e.g., a gearbox or return-to-home device) is configured with an energy storage member, e.g., a constant force or constant torsion spring, that stores energy under various conditions. One advantage of employing a constant torsion spring verses a conventional rotary windup spring is that it that force or torque applied by the device to the load remains constant throughout it operation allowing engineers to optimize the design of the application around a single known torque level. This eliminates the need to oversize tooling, etc. to compensate for springs that would require higher forces the more that the spring is wound. n one embodiment, a spring reacts to an excessive load condition on the output by storing excess energy, thereby limiting torque applied to the output. Thereafter, when the excess load condition is removed, the energy storage member can be released causing it to retract/rewind. The resetting of the energy storage mechanism maintains a positional relationship between the input and the output before the excessive load condition. In other embodiments, the energy storage member can store energy at initialization, and then back drive the output in response to some occurrence, e.g., a loss in power. This can be used to reset the driven system to a default or home position (e.g., driving a valve or other device to a desired power-loss position) either automatically or in response to a command.

Figure 1:
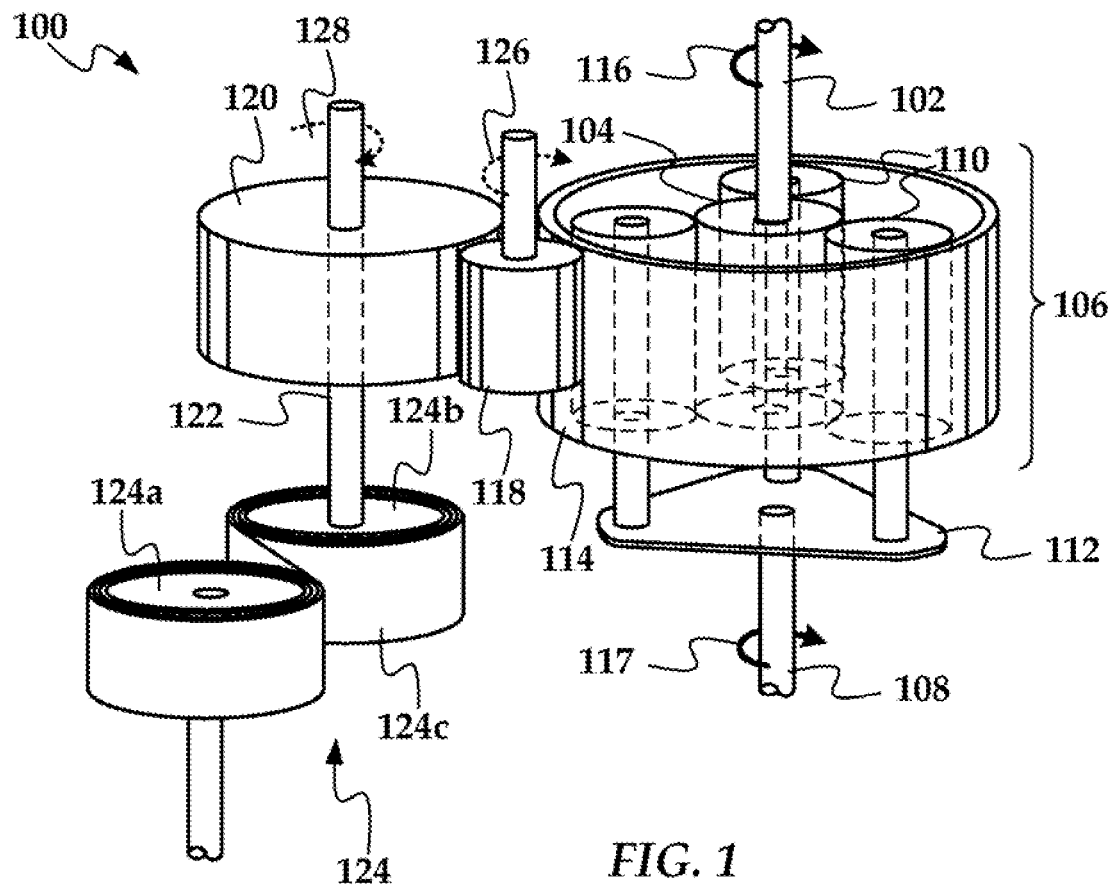
FIG. 1 is simplified perspective view of an output-torque-limiting gearbox according to an example embodiment.

The simplified diagram of FIG. 1 shows an output-torque-limiting gear assembly 100 according to an example embodiment. The gear assembly 100 may be used in a gearbox or other mechanical power-transmission apparatus. The gear assembly 100 includes an input shaft 102 affixed to a sun gear 104 of a planetary gearset 106. The sun gear 104 meshes with planet gears 110 of the planetary gearset 106. An output shaft 108 is affixed the planet gears 110 via a carrier 112. The planet gears 110 mesh with inner teeth of a ring gear 114 of the planetary gearset 106.

The illustrated gear assembly is designed to operate in a fixed ring gear configuration under most loading conditions. In a fixed ring gear configuration, the output shaft 108 turns in the same direction as the input shaft 102 (as indicated by arrows 116 and 117) due to the interaction between the sun gear 104 and the planet gears 110. The fixed ring gear configuration with the input tied to the sun gear 104 results in reduction gearing, causing the output shaft 108 to move slower than the output shaft 102.

While the illustrated arrangement has been described as operating in a fixed ring gear configuration under most load conditions, the ring gear 114 can move in some instances. In this arrangement, outer teeth of the ring gear 114 are meshed with an optional idler gear 118, which meshes with a spring shaft gear 120. The spring shaft gear 120 is affixed to a shaft 122, the shaft 122 being affixed to part of a constant torsion spring assembly 124. A constant torsion spring generally provides an approximately constant resistance to torsion. This is different than other torsional springs (e.g., helical springs) which provide a reactionary moment $\tau$ that is proportional to the amount of rotation $\theta$, e.g., $\tau=-\kappa\theta$, where $\kappa$ is the spring constant. It will be understood that a constant force mechanism may also be used to form a constant torsion spring, e.g., by affixing a constant force mechanism (e.g., weight, hydraulic damper) to a cable that wraps around a spool.

The illustrated constant torsion spring assembly 124 includes spools 124a-b about which are wrapped a metal band 124c. The metal band 124c, via its bending action, imparts an approximately constant torque to a parallel shaft 122 and thus the ring gear, through its rotational range of movement between the two spools 124a, 124b. When wound, the constant torsion spring assembly 124 stores energy that is later released when the constant torsion spring assembly 124 is unwound.

The spring assembly 124 and associated gearing 118, 120 act to prevent overloading the output shaft 108. A motor driving the input shaft 102 may be able to exert a moment on the output shaft 108 that exceeds some desired limit of the system designer. It may be desirable to provide a motor with excess torque capacity for purposes such as efficiency, reliability, response speed, etc., but at the same time to prevent output torque from exceeding some value, e.g., to prevent breakage of mechanical parts driven by the output shaft 108.

During normal operation (e.g., within expected torque limits of the output shaft), the ring gear 114 will exert a moment on the idler gear 118 and spring shaft gear 120 as represented by dashed arrows 126, 128. The spring assembly 124 has enough holding torque to keep the gears 114, 118, and 120 from moving under normal operational loads. Once the load on the output shaft 108 exceeds a particular amount, this will cause the spring assembly 124 to start winding in the direction indicated by arrow 128. The movement of the spring assembly 128 will cause the ring gear 114 start rotating and the output shaft 108 will stop rotating. Once this happens, the planetary gearset 106 is operating in a fixed planet mode, where the ring gear 114 is driven in an opposite direction from the sun gear 104. In the fixed planet mode, the planet gear carrier 112 does not rotate, although the individual planet gears 110 will rotate.

Figure 2:
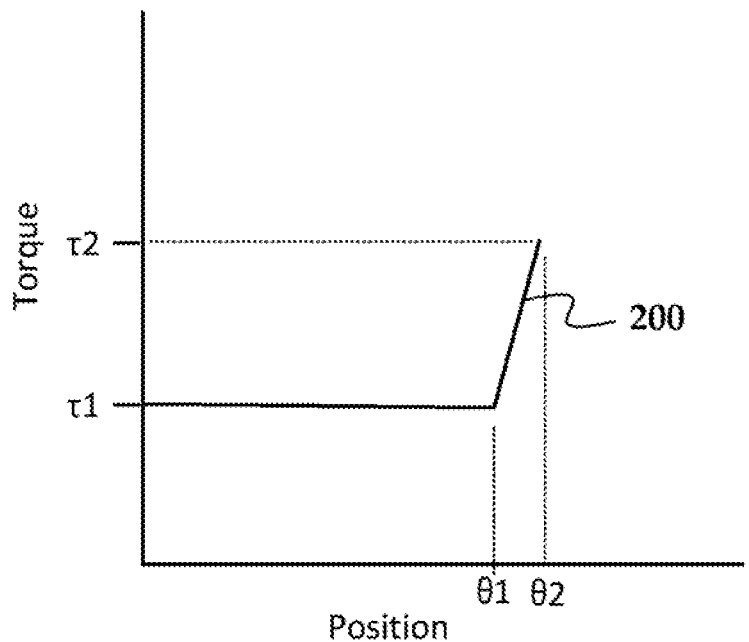
FIG. 2 is a graph showing operation of an output-torque-limiting gearbox according to an example embodiment.

The effect of the output torque limiter shown in FIG. 1 is illustrated in the graph of FIG. 2. The graph in FIG. 2 represents torque measured at the output shaft (curve 200) for a gear assembly with a torque-limiting feature as shown in FIG. 1. Up until position θ1, the output shaft is applying torque τ1, which is an operational torque within specification. At position θ1, an obstruction or the like inhibits the motion of the output shaft, causing the torque applied to the output shaft to rise to τ2 at position θ2. At position θ2, the ring gear overcomes resistance to movement offered by the spring assembly, and two events occur. First, the output shaft stops turning, being subject to torque no greater than τ2 thereafter. Second, torque applied to the ring gear of the planetary gear assembly by the input shaft causes the spring to wind and thereby store energy. Winding of the spring prevents the output torque from exceeding the threshold τ2, thus preventing an overload condition within the limits of the springs windup capability.

One notable feature of the torque limiter shown in FIG. 1 is that after the constriction on the output shaft is removed (e.g., the torque falls below the threshold τ2 after winding), the constant torsion spring unwinds and attempts to restore the positional relationship between the input shaft and the output shaft to a fixed position via an internal stop relative rotation limiter. This retains the desired positional relationship between the output shaft and input shaft that existed before the load was exceeded. This can be useful, for example, where the output shaft orientation (e.g., absolute rotation degrees) is measured at the input shaft and/or via gears or other components of the gearbox. For example, an encoder may be used to determine a number of rotations of the input shaft or other gearbox component, and this measurement may be used to infer a position of a component driven by the output shaft, e.g., a linear actuator. The illustrated spring assembly returns the input and output shafts to their positions relative to one another after the overload condition is removed. This allows the system to continue operation without having to reset the system, e.g., move to a starting position and zero a position sensor.

Figure 3:
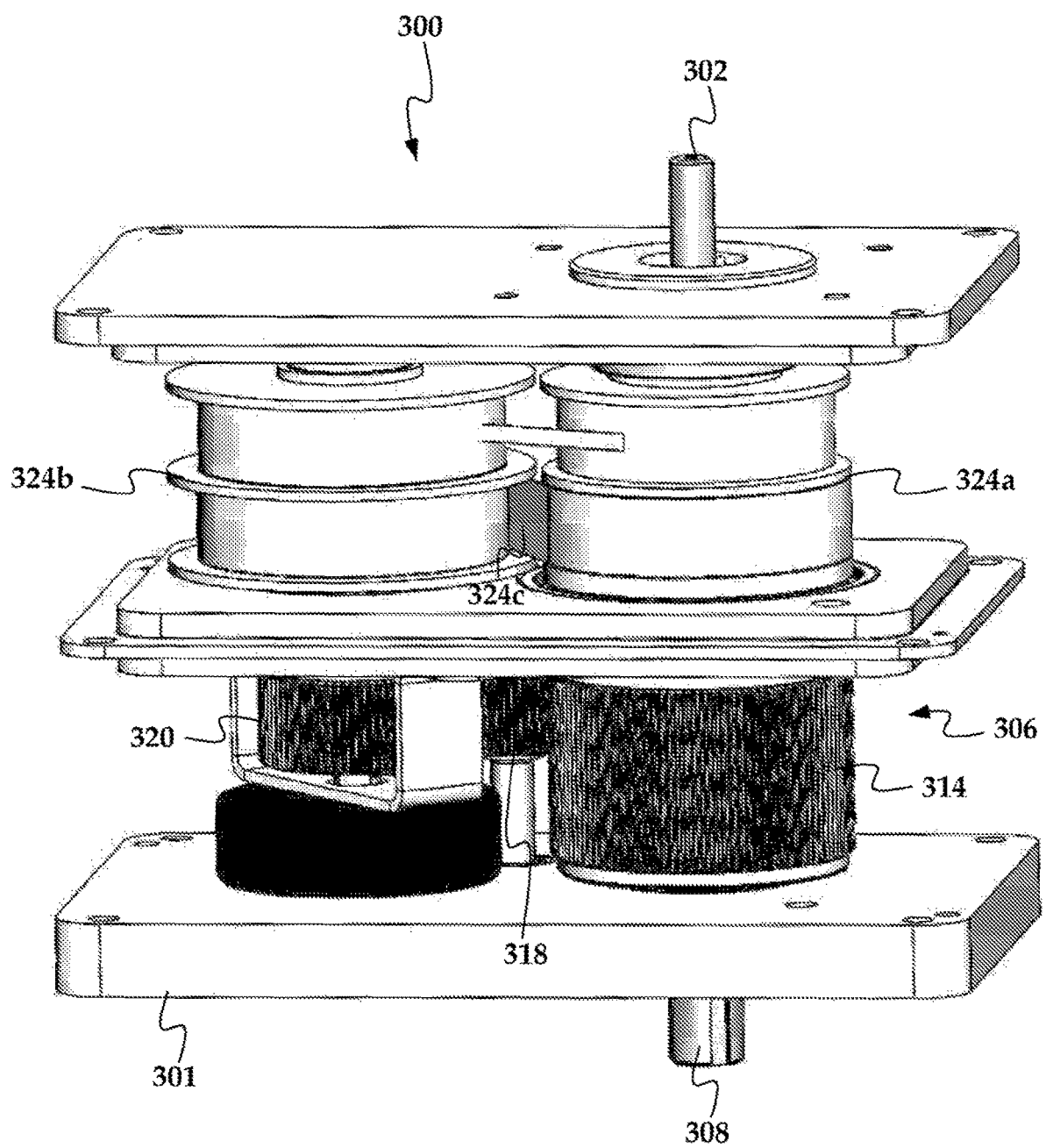
FIG. 3 is a perspective view of an output-torque-limiting gearbox according to an example embodiment.

In FIG. 3, a perspective view illustrates an output-torque-limiting gearbox 300 according to another example embodiment. The gearbox components are shown in a housing 301. Similar to the gear assembly in FIG. 1, the gearbox 300 includes an input shaft 302 affixed to a sun gear (not shown) of a planetary gearset 306. An output shaft 308 is affixed to planet gears of the planetary gearset 306 via a carrier (not shown). The planet gears mesh with inner teeth of a ring gear 314 of the planetary gearset 306. The outer teeth of the ring gear 314 mesh with an optional idler gear 318, which meshes with a spring shaft gear 320. The spring shaft gear 320 is affixed to a constant torsion spring assembly 324 via a shaft (not shown). The constant torsion spring assembly 324 includes spools 324a-b about which are wrapped a metal strip 324c. Unlike the arrangement shown in FIG. 1, the spool 324a is located around the input shaft 302, about which the spool 324a may spin freely. Otherwise, the arrangement shown in FIG. 3 may operate similar to the arrangement in FIG. 1.

Figure 4:
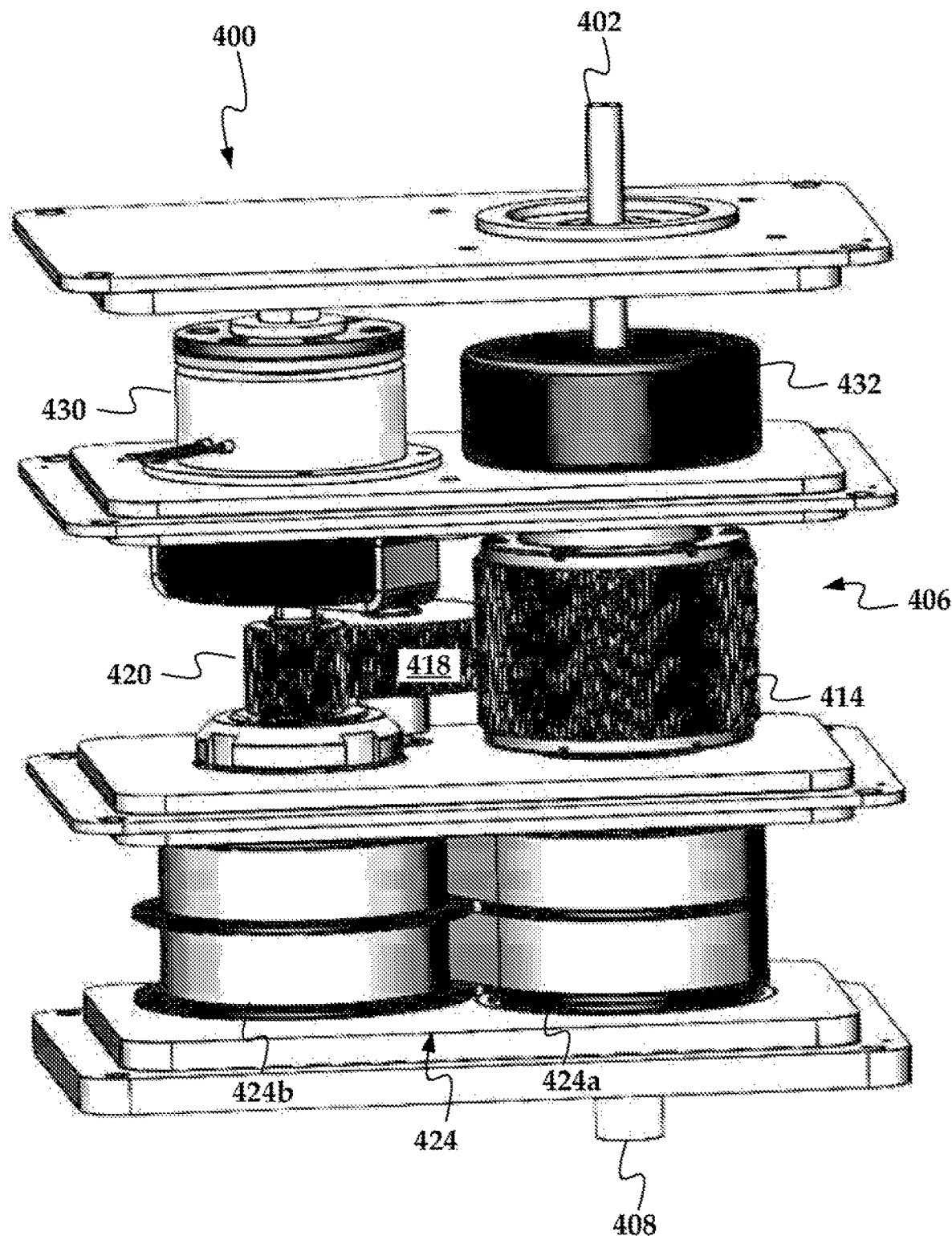
FIG. 4 is a perspective view of a return-to-home-position apparatus according to another example embodiment.

The previously shown arrangements can include additional features to alter the behavior of the constant torsion spring and associated gearing such that a driven device (e.g., a valve, door) can return to home position upon loss of power. An example of this is shown in FIG. 4, which is a perspective view of a return-to-home-position apparatus 400 according to an example embodiment. This apparatus 400 facilitates returning a driven apparatus to a home position of in the event of power loss. The apparatus 400 includes an input shaft 402 and output shaft 408 affixed to a planetary gearset 406 as previously described. The outer teeth of a ring gear 414 of the planetary gearset 406 mesh with an idler gear 418, which meshes with a spring shaft gear 420. The spring shaft gear 420 is affixed to spool 424b of a constant torsion spring assembly 424 via a shaft. Spool 424a of the constant torsion spring assembly 424 is able to spin freely around the output shaft 408.

The apparatus 400 further includes a first brake 430 (e.g., spring-holding brake) coupled to the shaft that ties together the spring shaft gear 420 and spool 424b of the constant torsion spring assembly 424. The first brake 430 is power-on engaged, and is always engaged during operation of the apparatus 400, except during an initialization procedure. During the initialization procedure, the output shaft 408 is prevented from moving (e.g., by driving an output device to a limit of movement at one end of its range of motion/home position, etc.) while the input shaft 402 is turned via a motor. This causes the input shaft 402 to turn the ring gear 414 and thereby wind the spring assembly 424. Once the spring assembly 424 is sufficiently wound (by turning a shaft to a final, second position), the first brake 430 is engaged, holding both the spring assembly 424 and the ring gear 414 in place. The first brake 430 remains engaged thereafter during operation. During operation, the apparatus 400 moves through a defined range of motion between the end of travel home position and the opposite end of travel, such as the open and closed positions of a valve.

A second brake 432 (e.g., drive brake) is shown around the input shaft 402. The second brake 432 is power-off engaged, meaning that it disengages from the input shaft 402 when power is applied and engages the input shaft 402 when power is removed. Generally, the first brake 430 and second brake 432 facilitate returning the output shaft 408 to the home position. The releasing of the first brake 430 allows the spring assembly 324 to unwind, thereby driving the ring gear 414, which drives the output shaft 408 to the home position. This may be used, for example, where the apparatus 400 is used to open and close a device (e.g., valve, door, lock, etc.), and it is desired to automatically close or open the device upon loss of power. The engagement of the second brake 432 at or about the same time as the first brake 430 releases prevents back-driving of the input shaft 402 while the spring assembly 424 turns the ring gear 414. The illustrated brakes 430, 432 are electromechanical, although other types of brakes may be used (e.g., mechanical, hydraulic, pneumatic, etc.)

While the function of the apparatus 400 can be achieved with a conventional torsional spring, the use of a constant torsion spring 424 may be useful in some applications. For example, the torque of a conventional torsional spring decreases as it unwinds due to the $\tau=-\kappa\theta$ behavior. As such, in order to apply the needed closing torque $\tau$ at the end of travel, the initial torque $\tau_{max}$ (e.g., immediately after power is lost when the spring begins to unwind) will be larger than this, in particular $\tau_{max}$, $=\tau+\kappa\theta_T$, where $\theta_T$ represents the maximum rotational angle needed to return to home position. In contrast, the constant torsion spring 424 can apply a torque that is sufficient to return to home position, but not significantly higher, through the full range of travel.

To utilize the apparatus 400 shown in FIG. 4, a controller (not shown) can activate the brakes 430, 432 as appropriate. The controller may include a microprocessor, memory and input/output busses, the latter interfacing with sensors and power control circuitry. The controller may include instructions that activate and deactivate brakes 430, 432, e.g., based on signals from position sensors, accelerometers, strain gauges, limit switches, encoders, etc., located within or outside of the apparatus 400. Controllers and electrically controllable devices are readily available and the system and components as described herein can be implemented by those of ordinary skill in the art.

Figure 5:
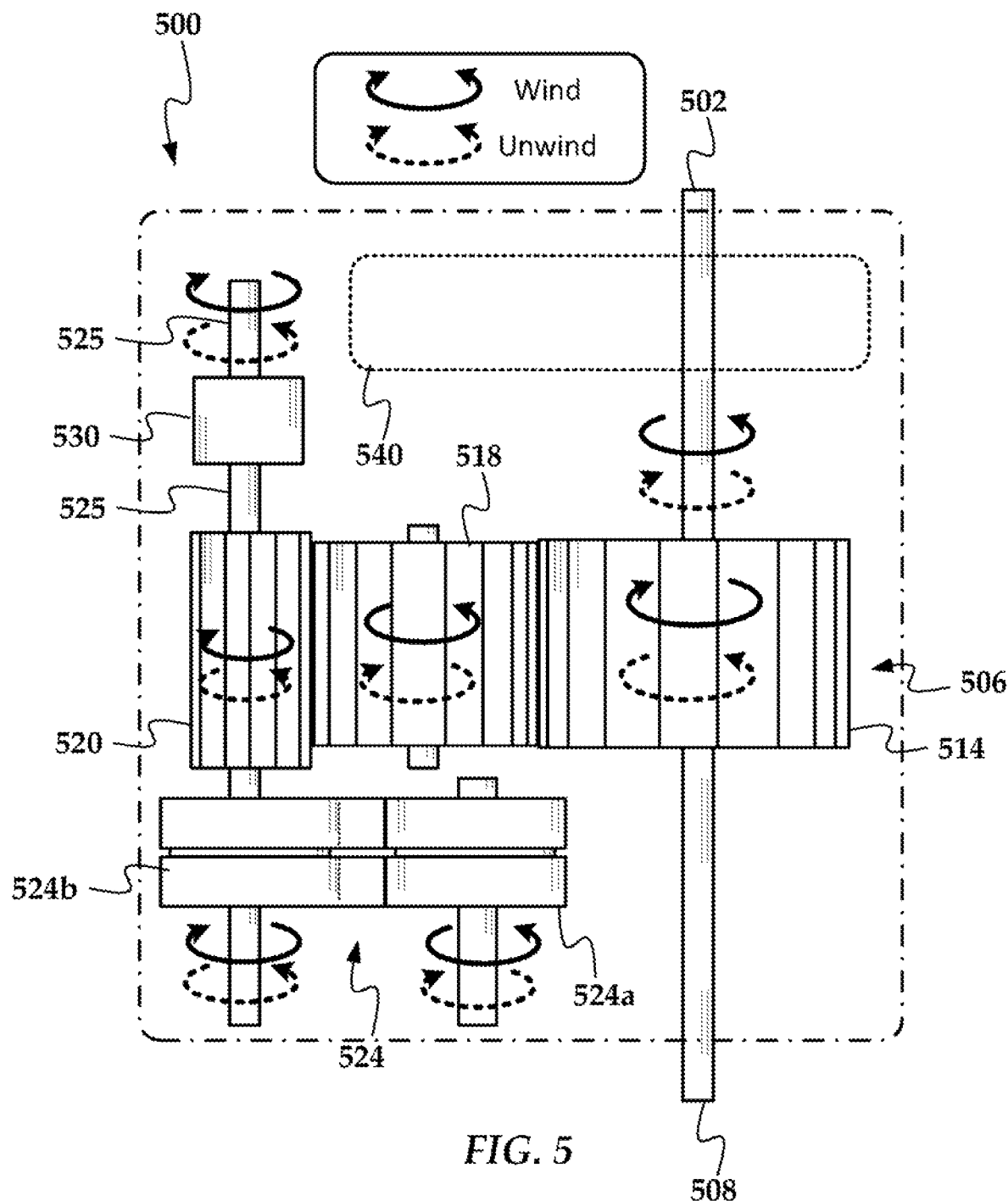
FIG. 5 is a schematic view of a return-to-home-position apparatus according to another example embodiment.

Although electrically-controlled components such as the brakes 430, 432 may be readily available, in some cases it may be desirable to limit the number of such components. In some cases, there may be improvements in cost, reliability, robustness, etc., by utilizing purely mechanical devices in place of electrically-controlled components. In FIG. 5, a simplified diagram illustrates an alternate return-to-home-position apparatus 500 that reduces the number of electrically controlled components compared to the embodiment shown in FIG. 4. The apparatus 500 includes an input shaft 502 and output shaft 508 affixed to a planetary gearset 506 as previously described. The outer teeth of a ring gear 514 of the planetary gearset 506 mesh with an idler gear 518, which meshes with a spring shaft gear 520. The spring shaft gear 520 is affixed to a spool 524b of constant torsion spring assembly 524 via a shaft 525, spool 524a of the constant torsion spring assembly 524 being able to spin freely.

The apparatus 500 includes an electrically-controllable spring-holding brake 530 that is operated similarly to brake 430 shown in FIG. 4 (e.g., engaged to hold the spring shaft during normal operation). The releasing of the spring assembly 524 drives the output shaft 508, via the ring gear 514, to a home position upon power loss. Instead of using a brake on the input shaft 502, a mechanical coupling device 540 is used that keeps the input shaft 502 from moving in response the brake 430 releasing the spring assembly 524 upon power loss, thereby preventing the spring assembly 524 from back-driving the input shaft 502.

In order to better understand the operation of the mechanical coupling device 540, arrows are shown in FIG. 5 indicating a rotation of various components during winding (solid arrows) and unwinding (dashed arrows). Table 1 below shows how the various components are operating during modes of the apparatus 500, with CW and CCW respectively indicating clockwise and counterclockwise.

TABLE 1

| Mode | State of spring shaft 525 | State of input shaft 502 |
| --- | --- | --- |
| Normal CW Output | No Movement (accomplished w/brake 530) | Powered CW |
| Normal CCW Output | No Movement (accomplished w/brake 530) | Powered CCW |
| Winding Spring 524 (after output is stopped during initialization) | Turning CW (Because of ring gear 514 turning) | Powered CCW |
| Unwinding Spring 524 (Brake 530 is released) | CCW (Torque of spring 524 turning) | No Movement (Needed to prevent back-driving) |

Figure 6:
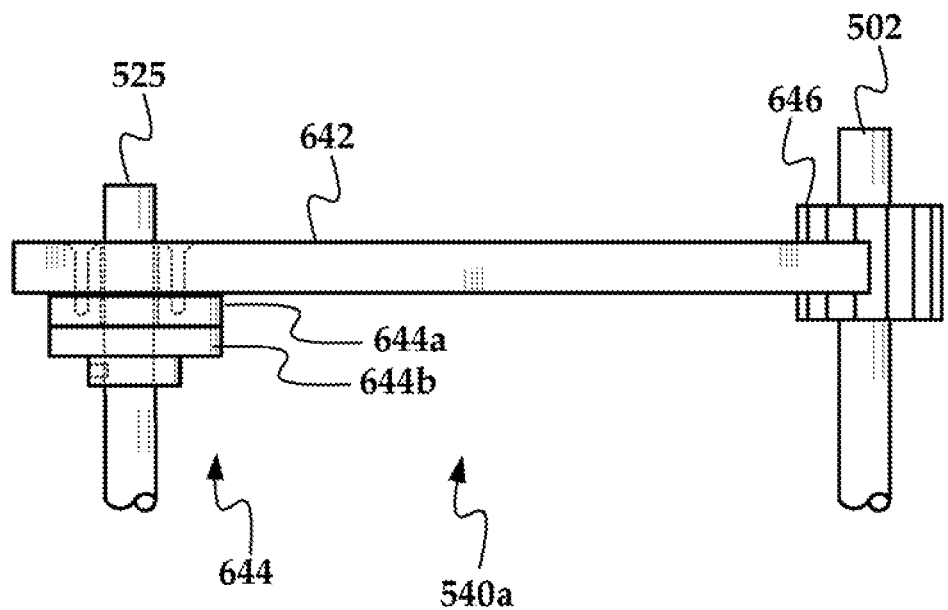
FIGS. 6 and 7 are side and top views of an input shaft holding device of a return-to-home-position apparatus according to an example embodiment.
Figure 7:
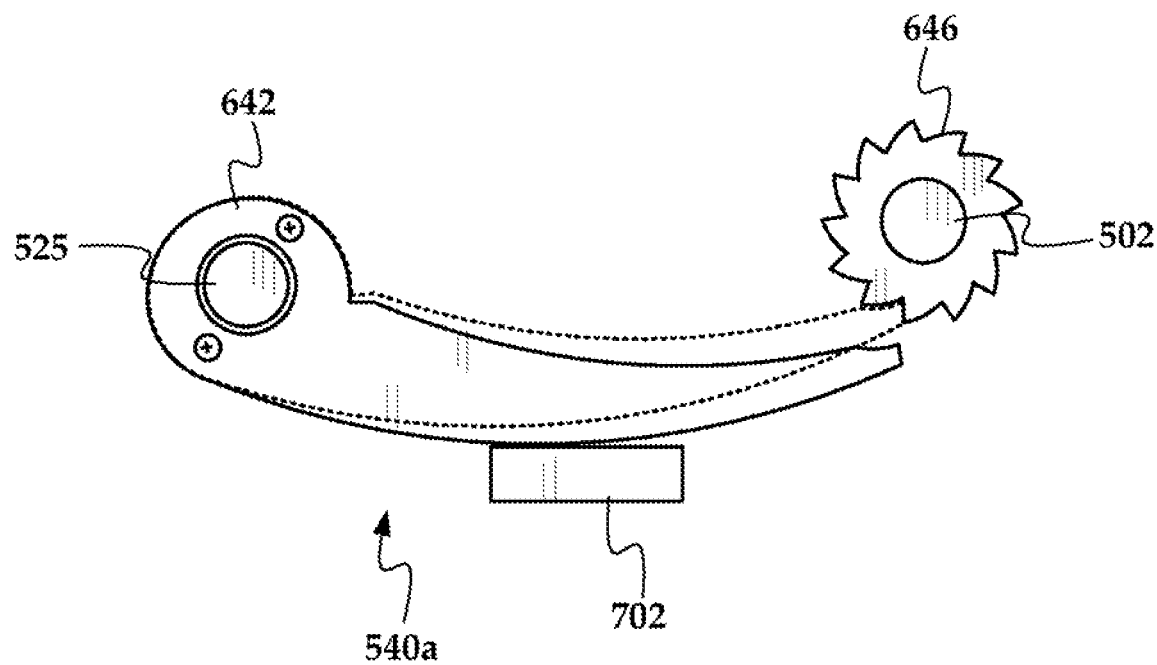

The states of the spring shaft and input shaft in this table also apply to the embodiment shown in FIG. 4, where the input shaft 402 is held in the "No Movement" state (last row and last column of Table 1) via the brake 432 while the spring 424 unwinds after a power loss. In the embodiment of FIG. 5, the mechanical coupling device 540 keeps the input shaft 502 from moving backwards (or back driving) when spring 524 unwinds. In FIGS. 6 and 7, respective side and top views show a mechanical coupling device 540a according to one embodiment. The mechanical coupling device 540a includes a pawl 642 coupled to the spring shaft 525 via a slip clutch 644. A top part 644 of the slip clutch 644 is affixed to the pawl 642 and a bottom part 644b of the slip clutch 644 is affixed to the spring shaft 525. The two parts 644a, 644b of the slip clutch 644 have a breakaway interface (e.g., friction plates) that cause the parts 644a, 644b to move together until a certain amount of torque is transmitted through the clutch 644, causing the parts 644a, 644b to slip with respect to one another.

An end of the pawl 646 is engageable with a ratchet 646 that is affixed to the input shaft 502. As seen in FIG. 7, a stop 702 restricts clockwise movement of the pawl 642, which will cause the clutch 644 to slip when the spring is being wound at initialization. Counterclockwise movement of the spring shaft 525 due to the release of the brake and unwinding of the spring will cause the pawl 642 to engage the ratchet 646, as indicated by the dashed outline in FIG. 7.

Before running in operational mode, an initialization procedure causes the spring assembly 524 to be wound, e.g., by stopping the output shaft 508 (e.g., turning it to a mechanical limit of an output device) while turning the input shaft 502 counterclockwise. Counterclockwise movement of the input shaft 502 turns the spring shaft 525 in a clockwise direction, resulting in the pawl 642 being in the disengaged position against the stop 702 shown in FIG. 7. Once the pawl 642 hits the stop 702, the slip clutch 644 overruns, allowing the spring shaft 525 to continue turning. After the spring 542 is wound, the brake 530 then locks the shaft 525, and the pawl 642 is held in place by the slip clutch 644. With the pawl 642 out of the way of the ratchet, input and output shafts 502, 508 of the apparatus 500 can turn in both clockwise and counterclockwise directions during operation.

In response to loss of power, the brake 530 releases, causing the spring shaft 525 to be powered counterclockwise by the spring 542 and driving the ring gear 514 of the planetary gearset 506. The counterclockwise movement of the spring shaft 525 moves the pawl 642 into the ratchet 646, stopping the input shaft 502 from moving in a clockwise direction. The input shaft 502 will be driven in a clockwise direction by the planetary gearset 506 when driven by the spring 524. The clockwise movement of the input shaft 502 and counterclockwise movement of the spring shaft 525 ensures positive engagement between the pawl 642 and ratchet 646.

Figure 8:
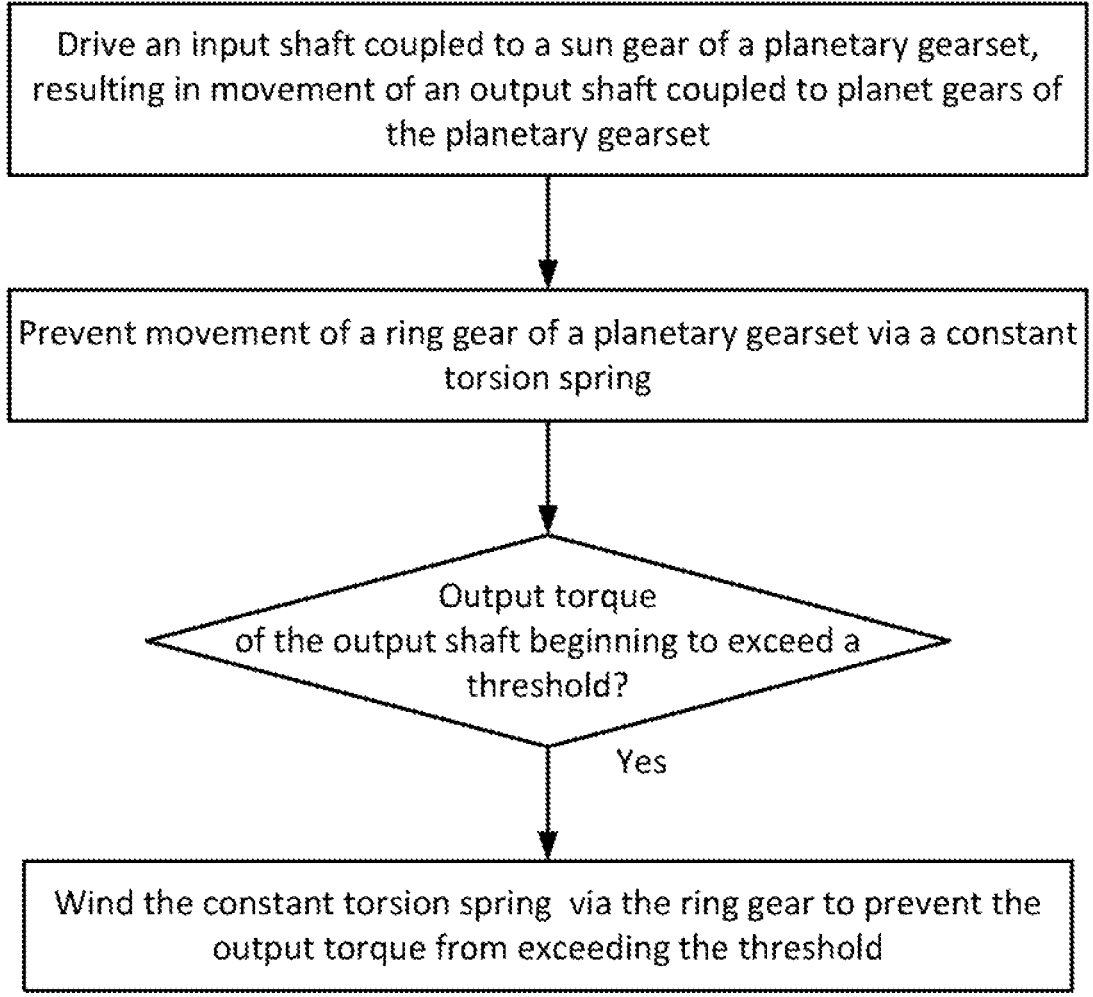
FIGS. 8 and 9 are flowcharts illustrating methods according to example embodiments.

In FIG. 8, a flowchart illustrates a method according to an example embodiment. The method involves driving an input shaft coupled to a sun gear of the planetary gearset is driven, resulting in movement of an output shaft coupled to planet gears of the planetary gearset via a carrier. Movement of a ring gear of a planetary gearset is prevented via a constant torsion spring, e.g., until a threshold torsion is applied to the constant torsion spring via the ring gear. In response to an output torque of the output shaft beginning to exceed an output threshold, the constant torsion spring is wound via the ring gear to prevent the output torque from exceeding the threshold.

Figure 9:
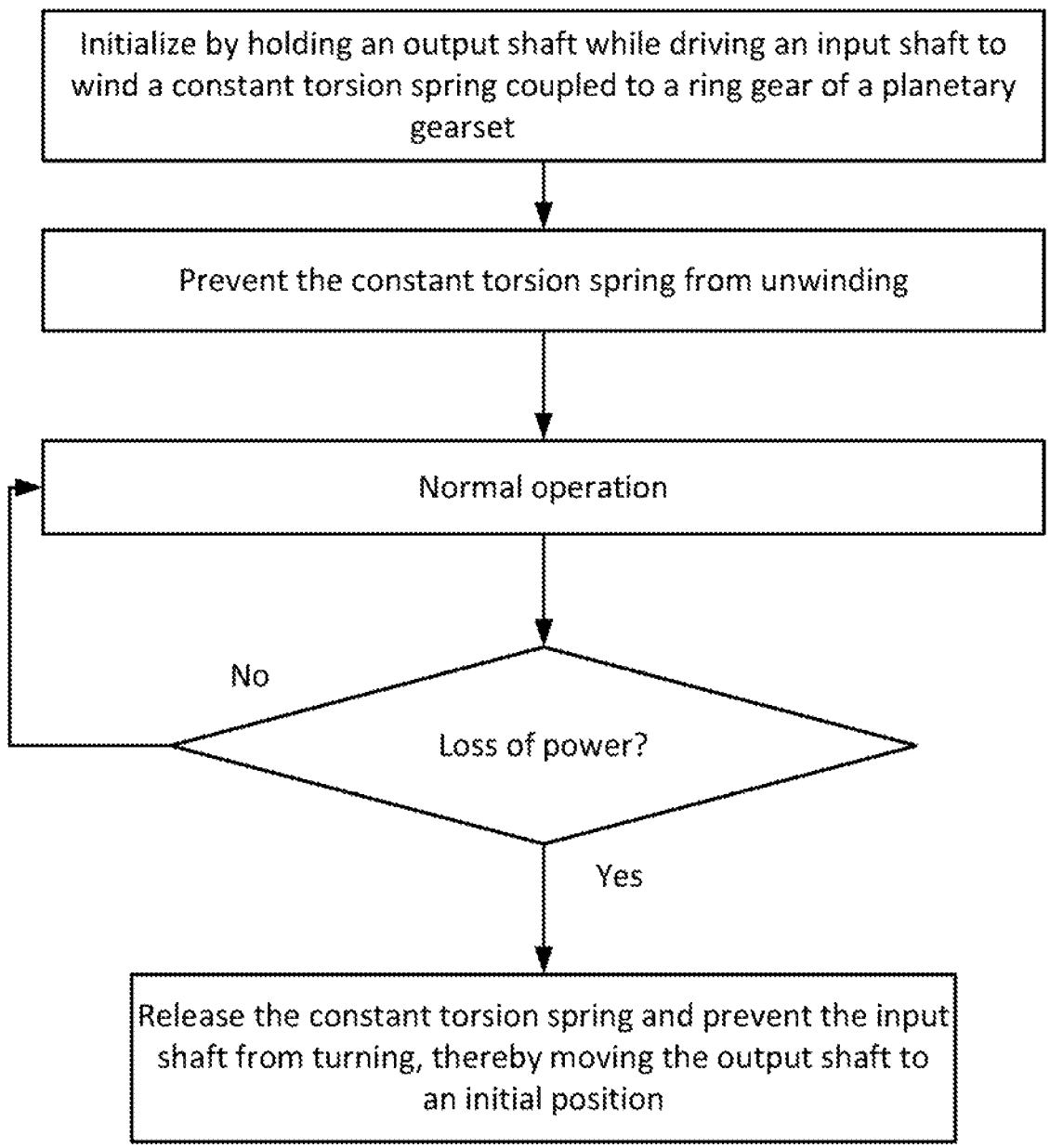

In FIG. 9, a flowchart illustrates a method according to an example embodiment. The method involves holding an output shaft while driving an input shaft during an initialization procedure to wind a constant torsion spring coupled to a ring gear of a planetary gearset. The input shaft is coupled to a sun gear of the planetary gearset and the output shaft is coupled to planet gears of the planetary gearset via a carrier. After the initialization procedure and during subsequent operation, the constant torsion spring is prevented from unwinding. In response to a loss of power, the constant torsion spring is released and the input shaft is prevented from turning. The releasing of the constant torsion spring and the preventing of the input shaft from turning moves the output shaft to a home position.

The foregoing description of the example embodiments has been presented for the purposes of illustration and description. It is not intended to be exhaustive or to limit the embodiments to the precise form disclosed. Many modifications and variations are possible in light of the above teaching. For example, the illustrated gearboxes and apparatuses are shown and described using input and output shafts, however any input or output means may be used to couple rotational power into and out of the gearbox. These input and/or output means may include plates, flanges, pulleys, flexible joints, gears, splined hole, etc. Further, while the illustrated planetary gearset and other gears are shown as spur gears, other gearing means may be used such as helical gears, bevel gears, screw gears, etc. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:
1. An apparatus comprising:
   a. a planetary gearset, the gearset including:
      i. a sun gear;
      ii. a rotatable ring gear;
      iii. planet gears operatively supported together by a carrier and interposed between the sun gear and ring gear,
      iv. an input shaft connected to the sun gear; and
      v. an output shaft connected to the carrier;
   b. an idler gear rotatably engaged with the ring gear;
   c. a rotatable spring shaft having a first end and a second end;
   d. a spring shaft gear mounted on the spring shaft at the first end and rotatably engaged with the idler gear;
   e. a first spool mounted on the spring shaft at the second end;
   f. a rotatable parallel shaft to the spring shaft, the rotatable parallel shaft having a second spool mounted thereon; and
   g. a metal band wrapped about the first and second spools, the metal band having a rotational range of movement between the first and second spools, whereby winding the metal band on one of the spools stores spring energy; wherein the metal band imparts an approximately constant torque to the spring shaft and, via the spring shaft gear and the idler gear, the ring gear through the rotational range of movement of the metal band between the two spools; and wherein the ring gear winds the metal band about the first spool when the torque level at the output shaft exceeds a threshold.

2. The apparatus of claim 1, further comprising:
   a. a first brake connected to the spring shaft, the first brake selectively engagable after the metal band has been wound on the first spool, and being power-on engaged; and
   b. a drive brake connected to the input shaft, the drive brake being power-off engaged,
   c. wherein when power is turned off, the drive brake engages to stop rotation of the input shaft and the first brake turns off allowing the wound metal band to move from the first spool to the second spool thereby rotating the spring shaft, which in turn rotates the spring shaft gear, idler gear, and the ring gear, whereby the output shaft is moved to a home position.

3. The apparatus of claim 1, wherein the rotatable ring gear includes outer teeth that cooperatively engage with teeth located on a circumference of the idler gear and the idler gear teeth engage with teeth located on a circumference of the spring shaft gear.

4. The apparatus of claim 1, wherein the metal band comprises a constant torsion spring.

5. An apparatus for selectively limiting output shaft torque or returning the output shaft to a home position, comprising:
   a planetary gearset comprising a sun gear, planet gears, and a rotatable ring gear;
   an input shaft coupled to the sun gear of the planetary gearset;
   an output shaft coupled to the planet gears of the planetary gearset via a carrier; and
   a constant torsion spring coupled to the ring gear of the planetary gearset; and
   wherein the apparatus selectively:
   a) in a first mode prevents the ring gear from moving when a torque at the output shaft is below a threshold, the ring gear winding the constant torsion spring in response to the torque exceeding the threshold, or
   b) in a second mode winds the constant torsion spring, via the ring gear, using a first brake and a second brake coupled to the ring gear and the input shaft, respectively, during an initiation phase and the first and second brakes arranged and configured in a power loss to return the output shaft to the home position as the constant torsion spring unwinds.

6. The apparatus of claim 5, wherein during the first mode, in response to the torque falling below the threshold after the winding of the constant torsion spring, the constant torsion spring unwinds and restores a positional relation between the input shaft and the output shaft.

7. The apparatus of claim 6, wherein the constant torsion spring comprises a first spool coupled to rotate with the ring gear and a second spool that freely rotates, the first and second spools being coupled by a metal band that coils around one or both of the first and second spools.

8. The apparatus of claim 5, wherein during the second mode:
   the first brake, being coupled to the ring gear and the constant torsion spring, is arranged and configured to engage following the initiation phase and disengage in response to a loss of power; and
   the second brake, being coupled to the input shaft, is arranged and configured to engage in response to the loss of power, the engagement of the second brake and disengagement of the first brake causing the constant torsion spring to drive the output shaft to the home position, wherein the engagement of the second brake prevents back-driving of the input shaft by the constant torsion spring.

* * * * *